Sept. 22, 1953  H. W. KOBERT  2,652,649
HUNTING DOG SIGNAL DEVICE
Filed Jan. 28, 1952

INVENTOR.
Herman W. Kobert
BY
Rodney Bedell
ATTORNEY.

Patented Sept. 22, 1953

2,652,649

UNITED STATES PATENT OFFICE 2,652,649

HUNTING DOG SIGNAL DEVICE

Herman W. Kobert, Doniphan, Mo.

Application January 28, 1952, Serial No. 268,589

2 Claims. (Cl. 40—129)

This invention relates to a device for indicating the position of a hunting dog, particularly in brush or high grass.

Heretofore it has been impossible for a hunter to know at all times the location of his dog as it ranges around, away, and ahead of him through tall grass, weeds and underbrush. Following an erratic course through such ground cover, the dog is hidden from the hunter much of the time, thus preventing the hunter from knowing the position of the dog.

When hunting fowl, a dog creeps as close to the birds as he can get without disturbing them and then goes on point. In this position the dog freezes. Any further movement on his part will generally alert the birds and cause them to fly before the hunter can approach. With the dog on point, hidden by ground cover, it is difficult for the hunter to find him, particularly if the dog was obscured from the hunter prior to going on point. Circumstances such as these cause a hunter to waste a lot of time hunting for his dog and fail to get shots at birds because they will often fly away while he is hunting for the dog.

The purpose of my invention is to provide a device for indicating the position of a dog, adapted to be mounted on the dog so that it will be visible at all times during his movement and when he is still.

A further purpose of my invention is to provide a device as described which will be flexible to yield in all directions and even in opposite directions, assuming a reverse bend if necessary to free easily from tangled underbrush or other obstacles.

A still further purpose of the invention is to provide a device which will not hamper or constrain the dog's movements.

These and other detail objects are attained by the structure shown in the accompanying drawings, in which.

Figure 1:
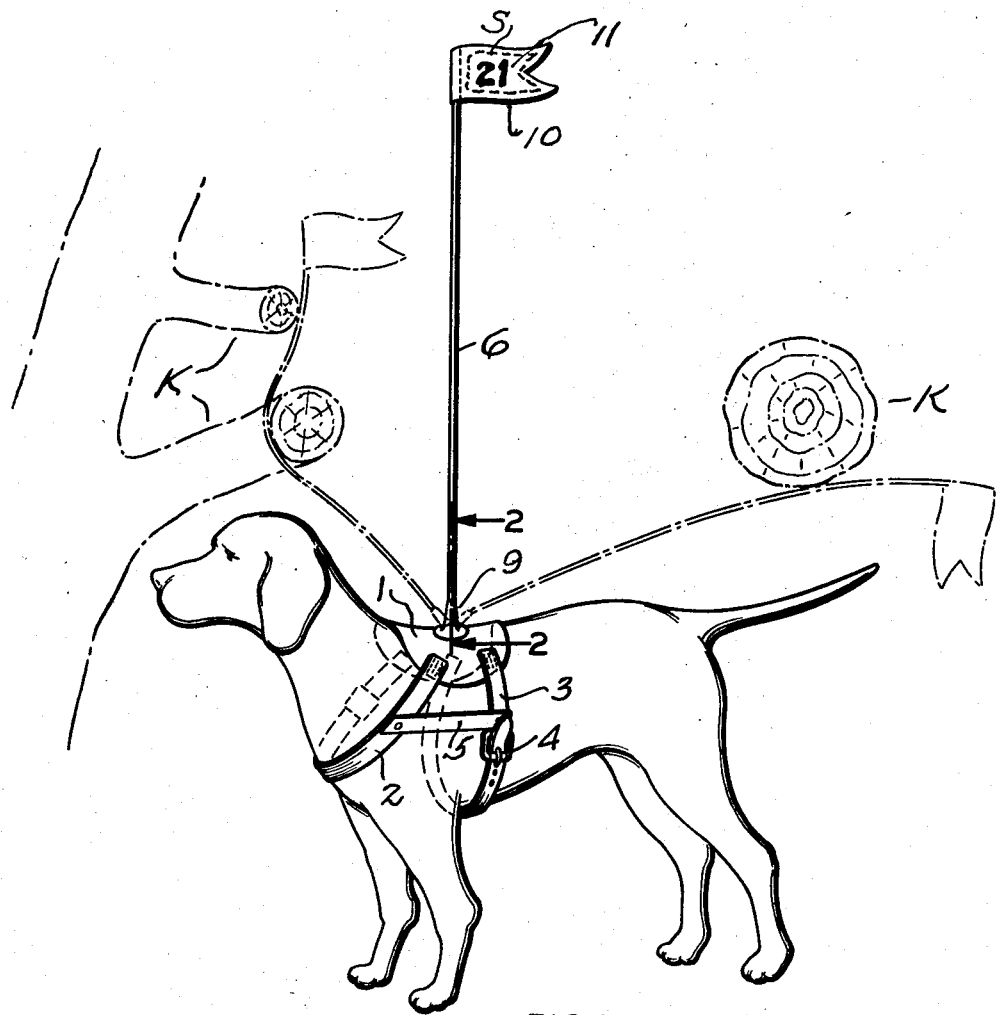
Figure 1 is a side elevation showing the signal mounted on a dog.

In the drawings, a pliable saddle 1 rests upon the dog's back. The forward end of the saddle is provided with a strap 2 passing around the dog's chest. The rear end of the saddle is provided with a girth strap 3 passing around the dog's body immediately behind the forelegs. Strap 3 is buckled at 4 so that it may be drawn tight in order that the saddle will not slip from its normal position. Straps 2 and 3 are joined by cross-straps 5 which, by resting against the dog's shoulders, help to prevent the saddle from slipping from side to side.

Mounted on the saddle is a signal staff 6 having a threaded boss 7 at its lower end, removably inserted in a socket 8, seated in a rubber, leather, or other flexible boot 9, stitched, cemented or otherwise secured to saddle 1. The upper end of the staff carries a signal 10 which is shown as heavy canvas stitched as indicated at S to avoid ripping. Obviously a plastic ball or other suitable signal may be substituted for the pennant shown. The signal may carry identifying data 11.

The staff 6 is constructed of light weight spring steel or glass fiber rod or some such smooth, highly flexible and tough material. The entire assembly should be as light as is consistent with necessary durability so as not to make the device cumbersome to the dog.

Figure 2:
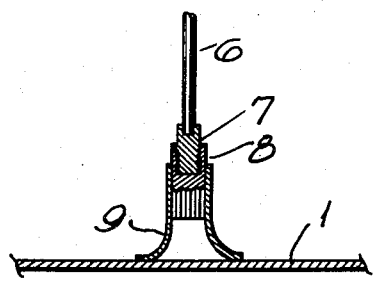
Figure 2 is a cross-sectional detail of the signal staff mounting.
Figure 3:
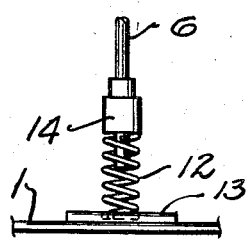
Figure 3 is a detail of an alternative form of the signal staff mounting.

Figure 3 shows another mounting for the staff comprising a coil spring 12 secured to a plate 13 attached to the saddle and carrying at its upper end a socket 14 into which the lower end of the staff may be threaded, as indicated at 7 and 8 in Figure 2.

Spring 12 will yield in every direction to permit the staff to swing throughout its length. As indicated above, it is desirable for the staff to be entirely flexible in itself and thereby cooperate with its mounting to accommodate movement of the dog freely irrespective of obstructions, such as indicated at K in Figure 1.

The staff and its signal may be readily removed for convenience, without removing the saddle harness from the dog, as may be desirable during temporary interruptions in the hunting program.

The details of the structure may be varied substantially without departing from the spirit of the invention, and the exclusive use of those modifications coming within the scope of the claims is contemplated.

What is claimed is:

1. A device for indicating the position of a hunting dog, comprising a saddle shaped for conforming to the contour of a dog's back, means for securing the saddle in place on the dog, a short flexible upstanding mounting member secured directly to the saddle, an elongated flexible staff secured at its lower end to said mounting member for extension upwardly therefrom, and a visual signal member disposed at the upper end of said flexible staff, whereby said staff and mounting member will be jointly yieldable in all directions for ready freeing from obstructions.

2. A device for indicating the position of a hunting dog, comprising a pliable saddle shaped for accommodating the contour of a dog's back, a harness for securing the saddle in place on the dog against inadvertent displacement, a short flexible upstanding receptacle-forming mounting member secured to the saddle and bendable from the vertical at its point of connection to the saddle, an elongated flexible staff detachably engaged at its lower end within the mounting member for extension upwardly therefrom, and a signal element mounted at the upper end of said staff, whereby said staff and mounting member will be jointly yieldable in all directions for ready freeing from obstructions.

HERMAN W. KOBERT.

References Cited in the file of this patent

UNITED STATES PATENTS

| Number | Name | Date |
|--------|------|------|
| 518,780 | Fogg | Apr. 24, 1894 |

FOREIGN PATENTS

| Number | Country | Date |
|--------|---------|------|
| 19,390 of 1912 | Great Britain | Aug. 24, 1912 |